United States Patent [19]

Topliffe

[11] 4,321,888
[45] Mar. 30, 1982

[54] BALL WITH EXTENDING TETHERS SERVING AS A TOY ESPECIALLY FOR SMALL DOGS

[76] Inventor: Doris H. Topliffe, 1710 Brookside Ter., Tacoma, Wash. 98465

[21] Appl. No.: 173,975

[22] Filed: Jul. 31, 1980

[51] Int. Cl.³ .................... A01K 29/00; A63B 39/00; A63B 43/00
[52] U.S. Cl. .................................... 119/29; 273/58 K
[58] Field of Search ............. 119/29; 46/51; 273/1 R, 273/58 R, 58 K, 58 C, 58 F

[56] References Cited

U.S. PATENT DOCUMENTS

| | | | |
|---|---|---|---|
| 2,040,522 | 5/1936 | Marx | 273/58 C |
| 2,540,309 | 2/1951 | Winsor | 119/29 |
| 2,948,532 | 8/1960 | Jepsen | 273/58 C |
| 3,437,147 | 4/1969 | Davies | 273/58 K X |
| 4,071,237 | 1/1978 | Hoogasian | 273/58 K X |
| 4,200,288 | 4/1980 | di Donato | 273/58 K X |

Primary Examiner—Robert Peshock
Assistant Examiner—Robert P. Swiatek
Attorney, Agent, or Firm—Roy E. Mattern, Jr.

[57] ABSTRACT

A ball with extending tethers serves as a toy especially for small dogs. Two molded hollow halves adhered together to form the ball are each formed with at least two and preferably four integral cylindrical interior passageway embossments, equally spaced, which when aligned with those of the other half, create watertight passageways arranged as chord orientated openings, perpendicular to the geometric plane that is common to both the halves, for receiving and securing portions of the tethers. Each tether extends outwardly from the molded hollow watertight ball a sufficient distance to be well gripped in the teeth of small dogs. Optionally, loose small objects, such as metallic balls, are placed within the two molded hollow halves, before they are adhered together, creating their internal watertight space. The movement of the balls creates interesting sounds when the ball is being played with by small dogs.

3 Claims, 4 Drawing Figures

BALL WITH EXTENDING TETHERS SERVING AS A TOY ESPECIALLY FOR SMALL DOGS

BACKGROUND OF THE INVENTION

Many balls used for children and adult games are too large for use by small dogs. Small balls or marbles, etc. when available, may be swallowed by small dogs. Yet when larger balls, like tennis balls, become somewhat disintegrated with portions extending from them, then small dogs enjoy playing with such semi destroyed balls, soon on their way to total destruction. At first, to provide a better ball for small dogs, holes were drilled in a standard plastic ball and cords were threaded through and across the interior of the ball, but soon the standard plastic ball was broken apart. So the ball disclosed herein was especially designed and provided especially for small dogs with the ball portion sized to avoid swallowing, made of very indestructable material, and provided with long lasting tethers, which are replaceable, after considerable pulling and chewing by small dogs.

No ball with extending tethers so arranged is believed offered by others, and a patent search indicated tethered balls have been disclosed for different purposes, for example: David Wilson's toy of a tethered ball knocked by hand and returned, U.S. Pat. No. 729,473; Marion H. Gaudet's tethered baseball swung in a circle to be hit by a batter, U.S. Pat. No. 3,214,166; M. Breidenbach's ball located at the midpoint of a tether held at each end by respective players, U.S. Pat. No. 1,782,254; and Earl F. Mitchell's pendant toy for animals, wherein a ball secured to a stick is swung from a tree limb to be played with by dogs, U.S. Pat. No. 3,459,158.

SUMMARY OF INVENTION

Small dogs now have a lightweight, waterproof yet durable ball, too large to be swallowed by them, but indirectly grippable and pullable via strong replaceable tethers, preferably made of clear material with optional interior movable objects, such as metallic balls. As so tethered the ball is playfully handled by one dog, or two or more may join in also pulling on the multiple tethers.

DESCRIPTION OF THE DRAWINGS

A preferred embodiment of the ball with extending tethers serving as a toy, especially for small dogs, is illustrated in the drawing, wherein.

DESCRIPTION OF THE PREFERRED EMBODIMENT

Figure 1:
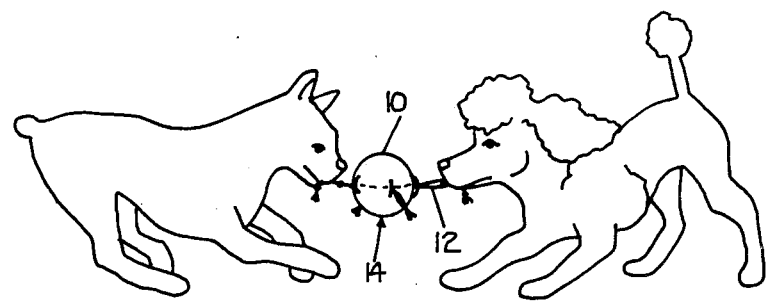
FIG. 1 is a general view of two small dogs pulling on the tethers of this ball.
Figure 2:
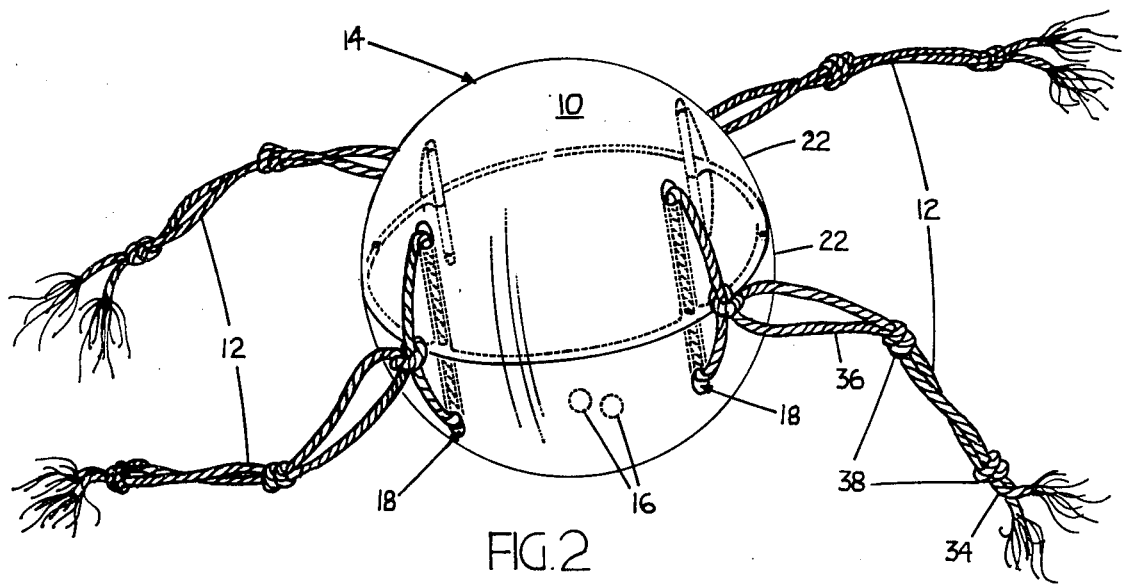
FIG. 2 is an enlarged perspective view of the ball and its tethers with some portions removed to show the securement of the tethers.
Figure 3:
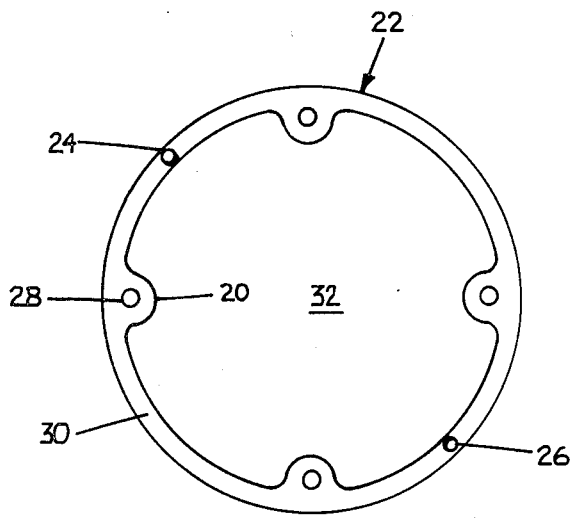
FIG. 3 is a view looking at the interior of one half of the ball before its securement to a like one half.
Figure 4:
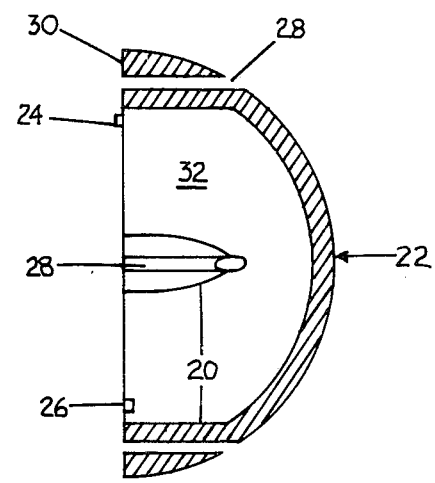
FIG. 4 is a sectional view through one half of a half of the ball to illustrate the interior embossments which form the watertight cylindrical passageways, upon final assembly, that receive the tethers.

As illustrated in FIG. 1, a ball 10 with extending tethers 12 serves as a toy 14, especially for small dogs. It is lightweight, waterproof, preferably made of clear material and optionally equipped with movable objects inside such as metallic balls 16, as illustrated in FIG. 2. The tethers 12 made of strong cord are secured, as shown in FIGS. 2, 3, and 4, by threading them through watertight cylindrical passageways 18 formed in the respective interior embossments 20.

During manufacture, two alike halves 22 are molded. At the conclusion of the process steps with respect to the two alike halves 22, each may have an optional alignment boss 24 and opposite optional alignment recess 26 for alignment purposes upon assembly, and each have at least two equally spaced internal embossments 20 with internal passageways 28 ultimately forming the overall passageways 18, that receive portions of the extending tethers 12. Preferably four overall passageways 18 are provided.

The abutting surfaces 30 of the respective halves 22, when adhered together during the manufacturing process, create a watertight interior 32 of the overall ball 10 and create the watertight passageways 18 for the tethers 12. The forming of the passageways 18 may require drilling in whole or in part.

In a preferred embodiment, the ball 10 is three and one half inches in diameter and formed from a polycarbon plastic material resulting in a thickness of about three sixteenths of an inch. The passageways 18 are about one eighth of an inch in diameter to accommodate strong cords, as tethers 12, subsequently extended in optionally lengths 34, loops 36, and knots 38.

It is to be noted the three and one half inch diameter was selected to keep the ball from rolling under furniture much as a davenport. Otherwise a dog in attempting to retrieve the ball could cause damage to the bottom of the davenport. Cotton cable cord, one hundred pound test weight, is used as the tethers, which could also be referred to as pull cords serving as handles or protuberances.

I claim:

1. A ball with extending tethers serving as a toy, especially for small dogs, comprising:
    (a) a ball, formed originally in two identical halves, each half having multiple integral cylindrical interior passageway embossments equally spaced, which when aligned with those like embossments of the other half, create watertight passageways, arranged as chord orientated openings, perpendicular to the geometric plane that is common to both halves, to receive and to secure extending tethers, and
    (b) tethers threaded through the internal passageways of the ball and beyond and secured to serve as gripable tethers for small dogs to hold in their mouths.

2. A ball, as claimed in claim 1, wherein the halves of the ball are created of clear plastic material and before their watertight securement of one to another, are partially filled with movable objects.

3. A ball, as claimed in claim 2, wherein the movable objects are metallic balls.

* * * * *